United States Patent [19]
Mayfield et al.

[11] Patent Number: 5,657,721
[45] Date of Patent: Aug. 19, 1997

[54] CAT EXERCISE TOY

[76] Inventors: Lydia J. Mayfield, 9631 Bond Rd., Dewitt, Mich. 48820; David Klimek, 455 Grayson Hwy., Suite 111-232, Lawrenceville, Ga. 30245; Larry L. Uland, P.O. Box 166, Argyle, Tex. 76226; Wendell Wilson, 669 Gordon Pl., Atlanta, Ga. 30310

[21] Appl. No.: 403,223

[22] Filed: Mar. 13, 1995

Related U.S. Application Data

[63] Continuation of Ser. No. 109,916, Aug. 23, 1993, abandoned.

[51] Int. Cl.⁶ .................................................. A01K 29/00
[52] U.S. Cl. .......................................... 119/707; 446/175
[58] Field of Search .................................. 119/707, 708, 119/711; 446/175

[56] References Cited

U.S. PATENT DOCUMENTS

| | | | |
|---|---|---|---|
| 3,295,499 | 1/1967 | Manchester | 119/708 |
| 4,391,224 | 7/1983 | Adler | 119/707 |
| 4,479,329 | 10/1984 | Fraden | 446/175 |
| 4,930,448 | 6/1990 | Robinson | 119/708 |
| 4,970,810 | 11/1990 | Liou | 446/175 X |
| 5,103,770 | 4/1992 | Berkovich | 119/708 |
| 5,119,001 | 6/1992 | Moore et al. | 119/708 X |

FOREIGN PATENT DOCUMENTS

| | | | |
|---|---|---|---|
| 4007676 | 9/1991 | Germany | 119/708 |
| 2222656 | 3/1990 | United Kingdom | 446/236 |

*Primary Examiner*—Robert P. Swiatek
*Attorney, Agent, or Firm*—H. Dennis Kelly; Timmons & Kelly

[57] ABSTRACT

Local and remote motion detectors sense the presence or movement of a cat in an area near the toy and in an area remote from the toy. In response to the motion detectors, an electric motor moves a target to attract the cat. A device disconnects the target from the electric motor, when the cat subdues the target, allowing the target to stop moving while being held by the cat and giving the cat an artificial sense of "post-kill" satisfaction, while simultaneously prolonging the component life of the toy.

20 Claims, 5 Drawing Sheets

CAT EXERCISE TOY

CROSS-REFERENCE TO RELATED APPLICATION

This is a continuation of application Ser. No. 08/109,916, filed Aug. 23, 1993, abandoned.

BACKGROUND OF THE INVENTION

1. Field of the Invention

This invention relates in general to a cat exercise toy for keeping a cat entertained and exercised. In particular, the invention relates to a new and improved cat exercise toy including a moving target for being chased by a cat, as the target moves in response to movements of the cat.

2. Description of Related Art

Those who have owned or otherwise provided care for a cat are familiar with the various types of toys available for batting about and being chased by a cat. These type exercise toys come in various shapes and sizes, and often include internal elements such as bells for creating a noise when they are either thrown by a cat's care provider or batted about by a cat. Although such devices are capable of momentarily securing the attention of a cat, the cat's attention is usually lost after the care provider departs the activity and is no longer available for throwing the toy or otherwise causing the toy to move.

It is well known that cats are characteristically drawn to small moving objects and will spend seemingly endless hours chasing after such objects. Those who provide care for cats are often amazed at how long a cat will remain attentive to chasing the mere end of a water hose being pulled through the grass.

Several more sophisticated cat toys that address this feline characteristic have been proposed. These devices have typically included a target, such as a rubber mouse, for being chased by a cat, and have included the attachment of the target to a string or cord for being pulled by a care provider. Others have included a wind-up mechanism, such as an internally disposed wind-up motor and cooperating wheels, for causing the target to race along the surface of a floor until being subdued by a cat or coming to a stop after the motor stops running. Other such devices have included means for suspending the target in the air and within reach of the cat, for moving responsive to being struck by the cat.

One device typical of this category of the prior art is disclosed in U.S. Pat. No. 4,499,855, granted to Galkiewicz. This patent discloses a cat toy having a long flexible component attached between a handle and a string that is terminated with a target. The flexible component is held in the hands at the handle and used to pull or otherwise whip-around the target in order to obtain the attention and subsequent active play of a cat. The objectives of Galkiewicz's disclosure include providing the cat some active amusement and exercise while the cat chases the target. The target is further capable of being subdued by the cat, and thereby giving the cat an amount of artificial "post kill" satisfaction upon bringing the chase to an end.

Unfortunately, the prior art devices require the active participation of a cat's care provider in order to be an effective toy or exercise device for the cat. Although typical care providers enjoy obliging a cat's playful tendencies by enticing the cat with such toys, care providers tend to tire at this activity significantly earlier than the cat they are tending. It is desirable, therefore, to provide a cat exercise toy that will provide entertainment for a cat, without requiring the attention of a care provider.

Other relevant animal toys are disclosed in U.S. Pat. No. 3,459,158, granted to Mitchell, and U.S. Pat. No. 4,438,727, granted to Thompson. The Mitchel patent discloses a device having a ball attached to the lower end of a rod suspended from a flexible line. A cat may set the toy in motion by striking the ball or attempting to grasp the ball with its teeth. Similarly, the Thompson patent discloses a device that provides a target, such as a ball, suspended from one of at least two co-linearly suspended rods of a mobile unit. Each of the rods is suspended from an off-center suspension point so that unequal torques are applied about the suspension point, causing the rods to be skewed relative to horizontal when in a rest position. Pulling, tugging, or otherwise disturbing the target causes both rods to dip and bob irregularly in a rotating pattern. This compound irregular action is translated to the target for attracting a cat. Although these examples of the prior art do not require the continued presence of a cat's care provider, they are merely passive in their movements and do require the presence of the care provider in order to initiate the attracting movement. Otherwise, a cat may need to be trained to initiate the movement on his own.

While the cat exercise toys of the prior art may be suitable for their particular purpose, or to general use, they would not be as suitable for the purposes of the present invention. Perhaps the most significant heretofore unachieved, yet desirable, characteristics of a cat exercise toy include: the ability of a particular toy to attract the attention of a cat without requiring either the presence of the cat's care provider or the prior training of the cat for being attracted to the toy; the ability of the toy to attract a cat's attention by moving a target responsive to the mere presence of the cat, the moving being independent of being touched by the cat; and, the ability of the toy to maintain the attention of a cat via moving the target responsive to the continuing movements of the cat.

SUMMARY OF THE INVENTION

The general object of the cat exercise toy of the invention is to provide a new and improved cat exercise toy that has all the advantages of the prior art and none of the disadvantages. In general, this object is accomplished by an improved cat exercise toy having a target that moves in response to the movements of a cat, for stimulating and maintaining interactive play between the cat and the toy, without the need for assistance from a cat care provider.

The cat exercise toy of the present invention includes a target for being batted about and chased by a cat, local sensing means for sensing the presence or movement of the cat near the toy, remote sensing means for sensing the presence or movement of the cat away from the toy, and means for moving the target responsive to the sensing means.

It is therefore an object of the present invention to provide a new and improved cat exercise toy that is capable of attracting the attention of a cat independent of the presence of a care provider.

It is another object of the present invention to provide a new and improved cat exercise toy capable of attracting the attention of a cat independent of any prior interaction between the toy and the cat.

A third object of the present invention is to provide a new and improved cat exercise toy including a target that moves responsive to the movements of a cat.

Another object of the present invention to provide a new and improved cat exercise toy that includes a moving target capable of stopping the movement upon being subdued by a cat.

It is a fifth object of the present invention to provide a new and improved cat exercise toy that may be easily and efficiently manufactured and marketed.

A sixth object of the present invention to provide a new and improved cat exercise toy that is of durable and reliable construction.

It is another object of the present invention to provide a new and improved cat exercise toy that meets all federal, state, local and other private standards, guidelines, regulations and recommendations with respect to safety, environmental friendliness, energy conservation, etc.

A final object of the present invention is to provide a new and improved cat exercise toy that is inexpensive to manufacture with regard to both materials and labor, and that accordingly can be sold at a low price to the consuming public, thereby making such a cat toy economically available to the buying public.

The above, as well as additional objects, features, and advantages of the invention will become apparent in the following detailed description.

BRIEF DESCRIPTION OF THE DRAWINGS

FIG. 2 is a sectional view along line 2—2 of FIG. 1, with a different target.

DETAILED DESCRIPTION OF PREFERRED EMBODIMENTS

As shown in FIGS. 1–5, the cat exercise toy 10 of the invention includes a target 190 attached to the upper end 80A of a flexible rod 80, extending from a removable lid 20 on a housing 30. A motion detector 61 is mounted on the external side surface 30S of the housing 30, for sensing the presence or movement of a cat in a designated response area 110 near the housing 30. A power ON/OFF switch 70S for enabling the cat exercise toy 10, and an associated power ON indicator 70L for indicating when the cat exercise toy 10 is enabled, are similarly mounted on the side surface 30S.

Figure 6:
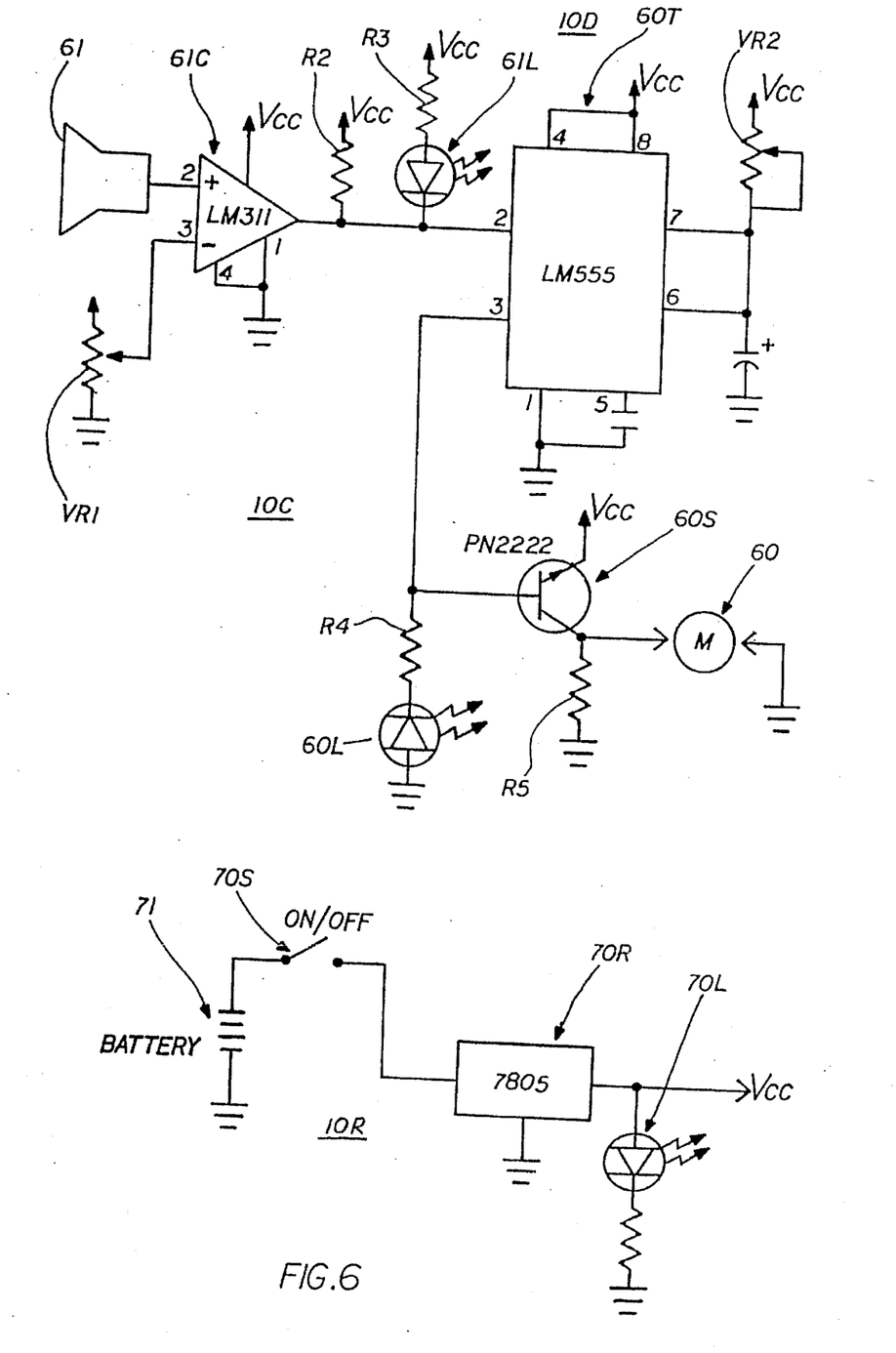
FIG. 6 is an electronic schematic of an embodiment of the electronic circuitry associated with the invention.
Figure 7:
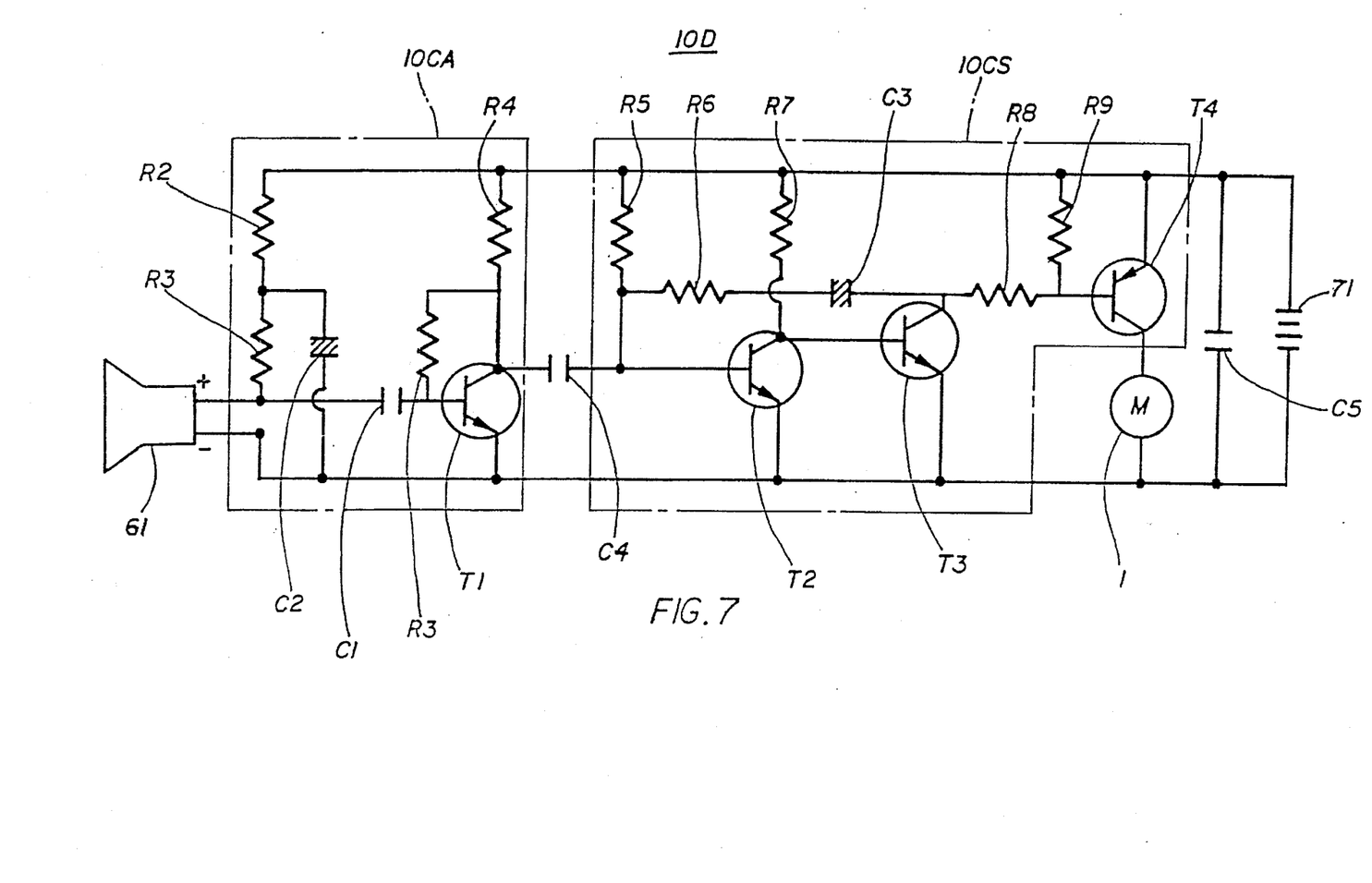
FIG. 7 is an electronic schematic of an alternate embodiment of the electronic circuitry associated with the invention.

An electric motor 60, with associated circuitry as shown in FIGS. 6 and 7, and other components of the means for moving the target 190 responsive to the motion detector 61, are mounted inside the housing 30, for transforming electrical energy from a power source into movement of the target 190. A motor ON indicator 60L and a motion-detected indicator 61L are also located on the side surface 30S adjacent opposite edges of the motion detector 61, for indicating when the electric motor 60 or the motion detector 61 has been actuated. Also affixed to the side surface 30S are a motion detector variable sensitivity switch 61S and a variable timer control 60C for selecting a suitable time period during which the target 190 will continue moving after the means for moving has been actuated.

Figure 1:
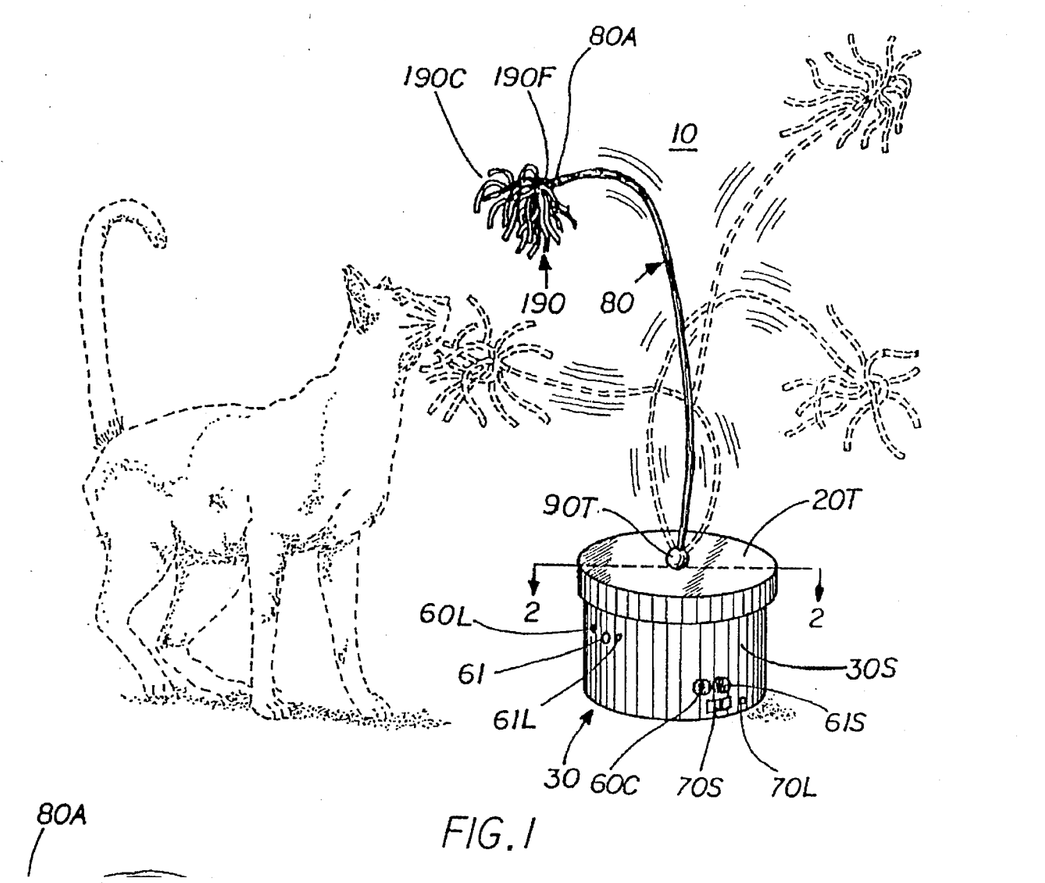
FIG. 1 is a perspective view of a cat exercise toy according to the invention.
Figure 3:
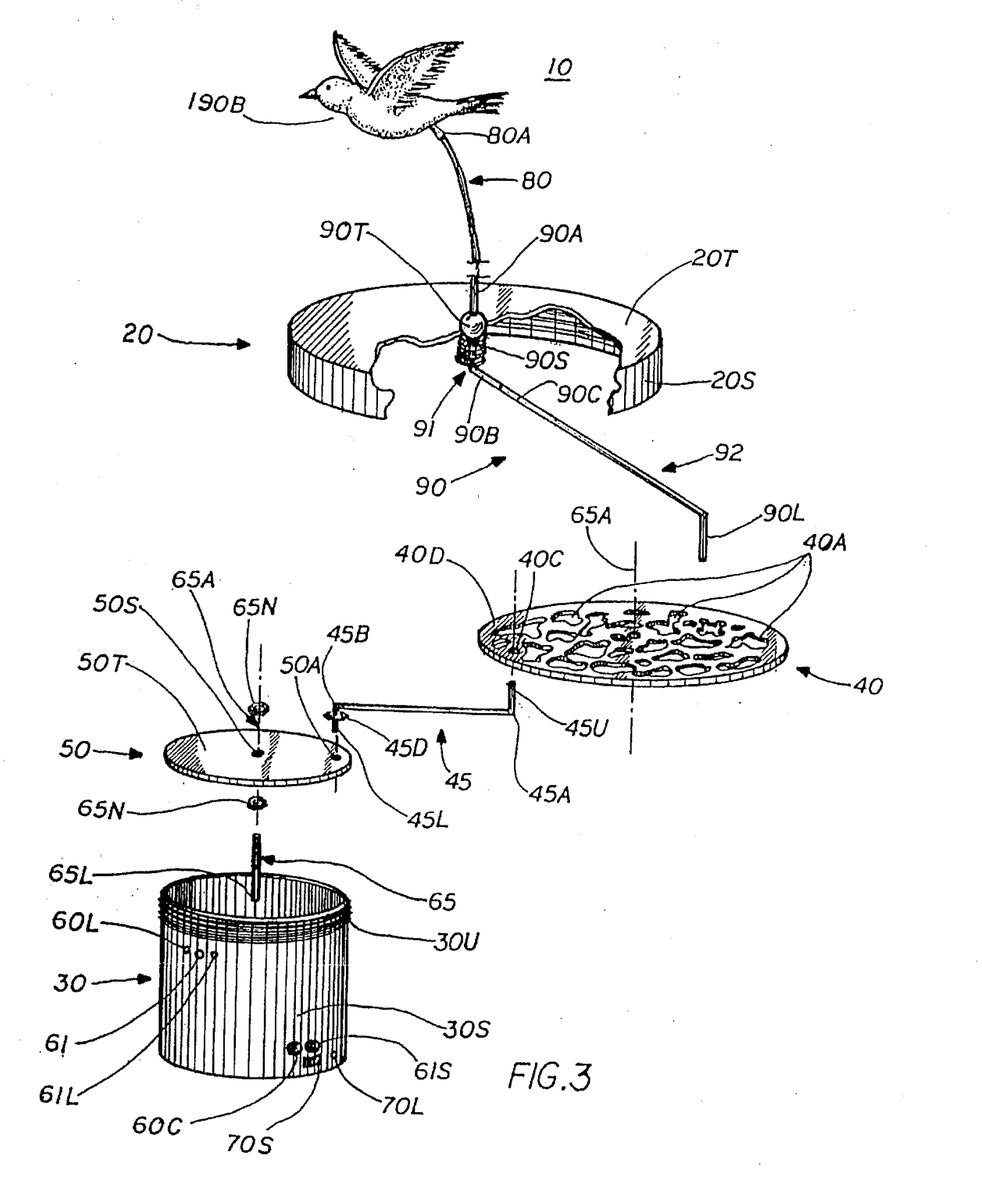
FIG. 3 is an exploded perspective view of a cat exercise toy, according to the invention, with a third type of target.

The target 190 is of a form, size, and weight suitable for being suspended and moved rapidly in the air by the flexible rod 80, and for being batted about by the cat. The target 190 is attached to the rod 80 with a suitable attaching means, so that the target 190 cannot be readily dislodged from the rod 80 by the cat. The attaching means is a common ball and socket connection between the male end 80A of the rod 80 and a female portion 190F of the target 190. The target 190 may be formed of a wide variety of materials and shapes suitable for attracting the attention of a cat, such as a colorful rubber mouse 190A, as shown in FIG. 2, or a bird 190B, as shown in FIG. 3. A small bunching of brightly colored rubber strands 190C, as shown in FIG. 1, has proven especially effective for this purpose.

The target 190 may also include means for producing a sound for attracting the attention of a cat. Those skilled in the art will be aware of a variety of small sound producing devices that can be affixed to the target 190 of the present invention for attracting the cat's attention, including small bells, small rattles, or miniature electronic bird sound imitators.

Figure 5:
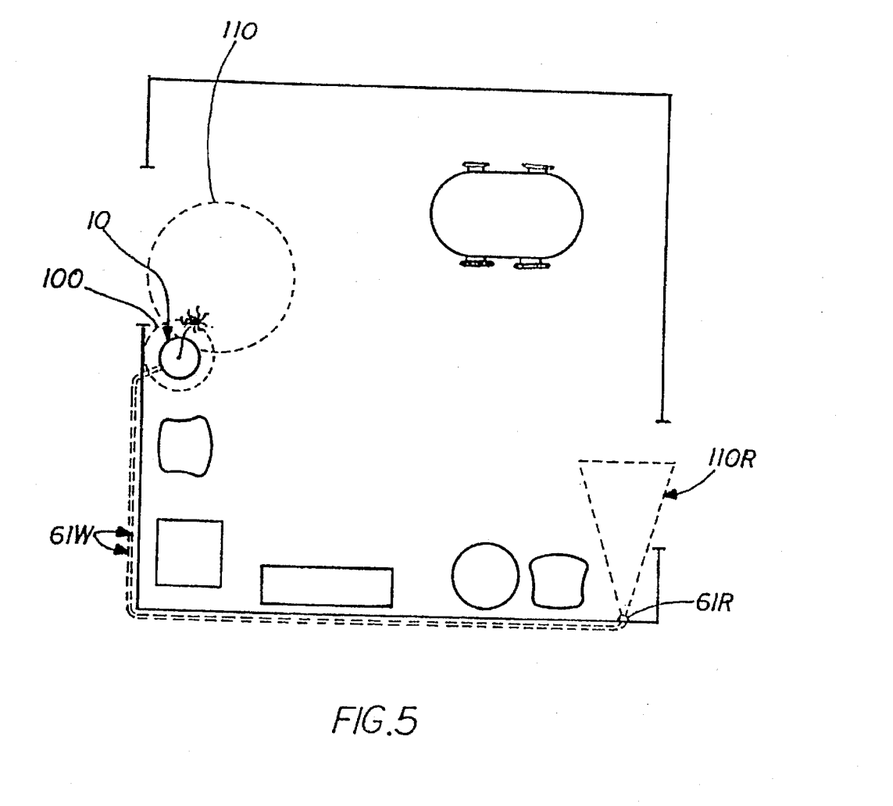
FIG. 5 is a top plan view of a cat exercise toy, according to the invention, located in a room.

The rod 80 suspends and moves the target 190 in a randomly generated path within a designated stimulus area 100, as shown in FIG. 5. The rod 80 is connected to a cam link 90 by a threaded connection between a threaded male lower end 80M of the rod 80 and a correspondingly threaded upper female end 90A of the cam link 90. The rod 80 is tapered from the lower end 80M to the upper end 80A, so the flexibility of the rod 80 continuously increases from the lower end 80M to the upper end 80A. The stiffness of the lower end 80M allows the rod 80 to respond readily to a random path generating means, while the increased flexibility of the upper end 80A provides an added randomness to the movement of the target 190 and allows the target 190 to be subdued by the cat without damage to the rod 80. Although a wide variety of suitable materials exist from which the flexible rod 80 may be made, it is preferred that the rod 80 be made from nylon, plastic, or fiberglass.

The random path generating means of the invention includes a cam 40, releasably connected to the lower end 90L of the cam link 90. The cam 40 includes a round disk member 40D having a plurality of irregularly shaped apertures 40A for releasably receiving the lower end 90L of the cam link 90, and a circular close-fitting aperture 40C for receiving the upper end 45U of a driving link 45. The aperture 40C is substantially perpendicular to each plane of an upper surface 40T and a lower surface 40L of the cam 40.

The cam link 90 further includes an upper surface bearing 90T affixed below and adjacent the upper female end 90A of the cam link 90 for rotatably mounting the cam link 90 through an aperture 20A of the lid 20. The aperture 20A has an axis that is substantially perpendicular to each plane of an upper surface 20T and a lower surface 20B of the lid 20. A pair of beveled edges 20E circumscribe the aperture 20A. An internally threaded lower circumferential edge 20S of the lid 20 is formed for connecting to a corresponding externally threaded upper circumferential edge 30U of the housing 30.

Also mounted on the cam link 90, below the aperture 20A, are two spring washers 90W for retaining a cam link spring 90S. The spring 90S and the spring washers 90W are slidably mounted on the cam link 90 below the bearing 90T and between the housing lid 20 and a lower female end 90B. The spring 90S biases the cam link 90 downward through the aperture 20A. An enlarged upper elbow 90E of the cam link 90 is provided above the lower female end 90B for keeping the washers 90 from moving below the lower female end 90B. The lower female end 90B is threaded to a corresponding male connecting portion 90C of the cam link 90. The connection between the lower female end 90B and the male connecting portion 90C divides the cam link 90 substantially into two shaft members: an upper shaft member 91 and a lower shaft member 92. Each of the shaft members 91 and 92 of the cam link 90 is made of material similar to that of the flexible rod 80. Those skilled in the art will recognize that the shaft members 91 and 92 may also be formed into the cam link 90 as a unitary structure.

The lower end 45L of the driving link 45 is connected to a disk-like driving gear 50 through a close-fitting aperture 50A. The aperture 50A has an axis substantially perpendicular to each plane of the upper surface 50T and the lower surface 50L of the driving gear 50. The driving link 45 also includes an upper elbow 45A and a lower elbow 45B for allowing the upper end 45U and the lower end 45L to engage the cam 40 and the driving gear 50 at substantially right angles. The driving link 45 is further formed of a light-weight and stiff material, such as aluminum, steel, or hard plastic, although a wide variety of other materials may be used.

A circular disk 45D is connected to the driving gear 45 substantially adjacent and below the lower elbow 45B, for preventing the lower elbow 45B from engaging the aperture 50A of the driving gear. The apertures 50A and 40C are set off center from an axis 65A about which each rotates, so when the driving gear 50 rotates in a complete 360 degree circle, the cam 40 oscillates about a 180 degree arc. This allows a cat care provider to locate the cat exercise toy 10 near a wall or a piece of furniture without hindering the movement of the target 190. As the cam 40 oscillates, the lower end 90L of the cam link 90 is moved about the perimeter of one of the plurality of irregular apertures 40A, thereby precipitating a wide variety of movement paths for the rod 80 and the target 190.

A driving shaft aperture 50S passes through the center of the driving gear 50, substantially perpendicular to both the upper surface 50T and the lower surface 50L of the driving gear 50, for connectably receiving a driving shaft 65. The driving shaft 65 is partially threaded and secured within the driving shaft aperture 50S by a pair of gear surface nuts 65N, each of which is threaded to the driving shaft 65 on an opposite surface 50T or 50L of the driving gear 50.

The lower end 65L of the driving shaft 65 is rotatably connected to an electric motor 60, for being rotated by the motor 60. The motor 60 is further electrically connected by circuitry 10C, shown in FIG. 6, to a DC power source 71, the motion detector 61, and the power ON/OFF switch 70S. An electrical connection of the motor 60 to an AC power source by an A/D converter may similarly be made within the scope of the present invention.

The motion detector 61 is mounted on the external side surface 30S of the housing 30, for sensing the presence or movement of a cat in a designated response area 110, shown in FIG. 5. As a cat enters the response area 110, the motion detector 61 senses its presence and actuates means for moving the target 190. The means for moving the target 190 is the mechanical cooperation between the motor 60, the drive shaft 65, the driving gear 50, the driving link 45, the cam 40, the cam link 90 and the flexible rod 80. As long as the cat remains in the designated response area 110, where its presence or movement can be sensed by the motion detector 61, the means for moving will remain actuated, causing the target to move about a randomly generated path, unless the cat is able to subdue the target 190. When the cat leaves the response area, a timing means allows the means for moving to remain actuated for a predetermined and adjustable time period, after which the means for moving is deactuated and the target 190 becomes inactive.

Figure 4:
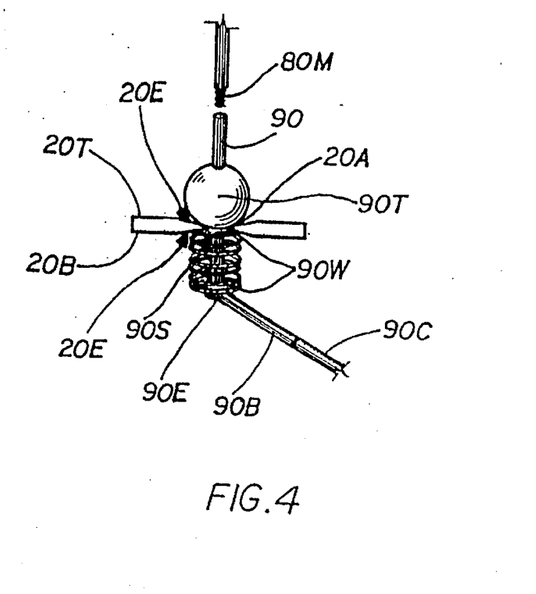
FIG. 4 is a close-up side elevation of cut-out area 4 of FIG. 2.

Means for disconnecting the target 190 from the means for moving allows the target 190 and the adjoining rod 80 and cam link 90 to be disconnected from the cam 40 when the cat subdues the target 190, allowing the target to stop moving while being held by the cat. The means for disconnecting gives the cat an artificial sense of "post-kill" satisfaction, and prolongs the component life of the cat exercise toy 10. When the cat subdues the target 190, the cat will hold the target 190 such that the flexible rod 80 is substantially parallel to the upper surface 20T of the lid 20. The upper surface bearing 90T will be pulled upwardly away from the aperture 20A such that the upper shaft member 91 of the cam link 90 tilts toward the horizontal and will be substantially in contact with each of the beveled edges 20E of the aperture 20A. The tilting of the cam link 90 will, in combination with the continuing rotation of the cam 40, cause the lower end 90L of the cam link 90 to be removed from the irregular apertures 40A, thereby inactivating the movement of the target 190.

When the cat releases the target 190, the spring 90S will cause the cam link 90 to return to its normal upright position, and thereby cause the lower end 90L of the cam link 90 to reengage the irregular apertures 40A of the cam 40. Should this occur while the cat remains in the response area 110, the motor 60 will still be actuated, causing the target to begin moving about a randomly generated path, and stimulating another chase by the cat. Those familiar with caring for cats will recognize that literally hours of play and exercise for a cat may be precipitated by use of the cat exercise toy of the present invention.

As illustrated in FIG. 5, the cat exercise toy 10 also includes remote sensing means for detecting the presence or movement of a cat in an area remote from the target 190. The means includes a remote motion detector 61R. While the motion detector 61 is mounted on the side 30S of the housing 30 for covering the designated response area 110 lying directly opposite the motion sensor 61 and near the housing 30, the remote motion detector 61R senses the presence or motion of a cat in a remote designated response area 110R, located well away from the housing 30. The motion detector 61R is connected to the electric circuitry of the cat exercise toy 10 by a "hard wire" conductor 61W. Alternatively, the remote motion detector 61R may be connected to the electric circuitry by an electromagnetic transmitter located in or near the motion detector 61R, for transmitting electromagnetic signals, such as radio frequency (RF) type waves, to a receiver located with or near the cat exercise toy 10. Use of the remote motion detector 61R allows for an extended area in which a cat may be stimulated to play with the cat exercise toy 10. The only limitation to the location of the remote motion detector 61R, and the corresponding location and size of the response urea 110R, is that a cat entering the response area 110R should be able to see or hear the target 190 that is moved responsive to the cat entering the response area 110R.

An example of using the remote motion detector 61R in conjunction with a remote designated response area 110R is provided by placing the remote motion detector 61R across a doorway of a room in which the housing 30 is located. As a cat crosses through the doorway, the motion detector 61R senses its presence in the remote designated response area 110R and transmits a signal to the housing 30, whereby the flexible rod 80 begins moving the target 190 through its designated stimulus area 100 or the target 190 begins to emit an appropriate noise to attract the attention of the cat. As the cat subsequently approaches the housing 30, it moves out of the second designated response area 110R and into the designated response area 110 near the housing 30, for actuating the motion sensor 61 and the subsequent continued movement of the target 190. Those familiar with cats will readily comprehend the benefits this feature of the present invention may bring to both the pleasure of a cat and the joy of caring for the cat.

The electric circuitry 10C of the cat exercise toy of the invention is illustrated in FIG. 6. The circuitry 10C includes the motion detector 61, a variable comparator 61C for allowing a cat's care provider to adjust the "sensitivity" of the motion detector 61, a variable timer 60T for allowing the care provider to select a suitable-time period for the target to remain moving after the means for moving has been actuated, and a power amp 60S for actuating the motor 60. The motion detector 61 may be an infrared pyrometer, a photodiode, a phototransistor, a silicon pn-junction detector, a silicon PIN diode, a GaA diffusion detector, a GaA Schottky type detector, a GaP photodiode, or a CCD detector array. These and other similar detectors are available for detecting an animal's movement by the variation in light or heat incidence upon the motion detector resulting from the animal moving within an area covered by the range of the detector. Examples of such detectors include a variety of infrared pyrometers by Omega, which are excellent during all levels of light, or one of a variety of photodiodes and phototransistors by UDT, Siemens, or Hamamatsu. A variety of CCD detectors can be obtained from EGG Reticon, Kodak, Texas Instruments, Tektronix, Thomson, or Toshiba.

The comparator 61C is a common LM311 component, and compares the output of the motion detector 61 to the sensitivity level selected by the care provider by a variable resistor VR1 connected to the sensitivity switch 61S, shown in FIG. 1. Current matching the desired sensitivity passes through the comparator 61C and actuates the motion-detected indicator 61L and the variable timer 60T. A common digital LED is used for the indicators 61L, 60L, and 70L, although a wide variety of visual indicators are also available.

A wide variety of timers are also available for serving the purposes of the timer 60T, including the well known LM555 and the MC1455. The care provider may adjust the time period the target will be in motion with the variable timer control 60C, shown in FIG. 1, connected to the variable resistor VR2. The timer 60T will begin the selected timing cycle when a change in the output of the comparator 60C indicates that a certain threshold has been reached, indicating sufficient motion or heat has been detected to trigger the motorized motion of the cat exercise toy 10.

During the timing cycle, a power amp 60S, such as a PN2222 silicon switch, is enabled for supplying power to the motor 60. When the motor 60 is enabled, the cat exercise toy 10 will operate as previously described, moving the target 60 back and forth in a variety of random paths. Further illustrated in FIG. 6 is a regulating circuit 10R for regulating the current from a DC power source for use with the electric motor 60. Included in the circuit 10R is the power ON/OFF switch 70S, the power ON/OFF indicator 70L, and a common voltage regulator 70R.

Another embodiment of the electric circuitry for use with the cat exercise toy 10 is illustrated in FIG. 7. In this embodiment, the circuitry 10D includes a motion detector 61 for sensing a predetermined level of motion. An amplifier circuit 10CA amplifies an electric signal generated by the motion detector 61 responsive to the external motion. A switching circuit 10CS, operative in response to the amplified electric signal of the amplifier circuit, actuates the motor 60. The motion detector 61, the amplifier circuit 10CA, and the switching circuit 10CS are electrically connected to one another.

More specifically, the amplifier circuit 10CA includes four resistors R1, R2, R3 and R4, a capacitor C1, an electrolytic capacitor C2, and an npn transistor T1. The amplifier circuit 10CA also has an input terminal connected to the output terminal of the motion detector 61.

The switching circuit 10CS includes five resistors R5, R6, R7, R8 and R9, a pair of npn transistors T2 and T3, a pnp transistor T4, and an electrolytic capacitor C3. The switching circuit 10CS has an input terminal connected to the output terminal of the amplifier circuit 10CA through a capacitor C4. The transistor T4 of the switching circuit 10CS further includes a collector to which the motor 60 is connected. A decoupling capacitor C5 for the entire circuit 10D and at least one DC power source 71 are connected to an emitter of the transistor T4 and the output terminal of the motor 60 in parallel relation to one another. A switch 70S is connected to the power source.

The circuitry 10D is enabled when the switch 70S for the power source 71 is turned on. When the motion detector 61 senses a predetermined level of movement within its range, an electric signal is sent to the amplifier circuit 10CA for amplification. By the amplified electric signal, the transistor T2 of the switching circuit is turned on, sequentially followed by the turning on of the transistors T3 and T4, thus actuating the motor 60. This embodiment of the circuitry 10D of the cat exercise toy of the present invention is extremely simple and economical in both component parts and labor, which can be an advantage for the care provider who does not mind being restricted to a preselected level of motion-detector sensitivity or the inability of the target 190 to keep moving once the cat has departed the designated response area. A wide variety of other circuitry for actuating the motor 61, and thereby the movement of the target 190, exists as well.

The new and improved cat exercise toy 10 of the invention has several advantages over the prior art. The cat exercise toy 10 of the invention includes a target 190 for being chased by a cat, local and remote means for sensing the movement of a cat, and means for moving the target responsive to the means for sensing. Further included in the cat exercise toy is means for disconnecting the target from the means for moving, allowing the target to stop moving while being held by the cat, and thus giving the cat a sense of satisfaction while simultaneously prolonging the component life of the cat exercise toy. The cat exercise toy of the invention is capable of providing hours of play and exercise for a cat in the absence of the cat's care provider.

The invention has been described in only a few embodiments. It should be apparent to those skilled in the art that the invention is not so limited, but is susceptible to various changes and modifications without departing from the spirit of the invention.

We claim:

1. A cat exercise toy, comprising:
    a target member for being batted about and chased by a cat;
    local sensing means for detecting the presence and the movement of the cat in a response area substantially in the vicinity of the target member;

remote sensing means for detecting the presence and the movement of the cat in a response area remote from the target member; and means for moving the target member responsive to the sensing means.

2. A cat exercise toy as recited in claim 1, further comprising means for disconnecting the target member from the means for moving when the target member is subdued by the cat.

3. A cat exercise toy as recited in claim 1, wherein at least one of the means for sensing is a motion detector from the group consisting of infrared pyrometers, photodiodes, phototransistors, silicon pn-junction detectors, silicon PIN diodes, GaA diffusion detectors, GaA Schottky type detectors, GaP photodiodes, and CCD detector arrays.

4. A cat exercise toy as recited in claim 3, wherein the means for moving includes an electric motor; and wherein the remote sensing means is connected to the electric motor via an electronic circuit including a variable comparator for adjusting the sensitivity of the remote sensing means, a variable timer for selecting a suitable time period for the target member to remain in motion after the means for moving has been actuated, and a power amplifier for actuating the electric motor.

5. A cat exercise toy as recited in claim 3, wherein the means for moving includes an electric motor; and wherein the remote sensing means is connected to the electric motor via an electronic circuit including an amplifier circuit for amplifying an electric signal generated by the remote sensing means, and a switching circuit operative in response to the amplifier circuit for actuating the electric motor.

6. A cat exercise toy, comprising:

a target member for being batted about and chased by a cat;

sensing means for detecting the presence and the movement of the cat; and an electric motor responsive to the sensing means and having a drive shaft connected to a driving gear, the driving gear being further connected to a cam via a driving link, the cam being further connected to a flexible rod member via a cam link, the flexible rod member being further connected to the target member for moving the target member responsive to the electric motor.

7. A cat exercise toy as recited in claim 6, further comprising means for disconnecting the cam link from the cam when the target member is subdued by the cat.

8. A cat exercise toy as recited in claim 6, wherein the target member is of a form, size, and weight suitable for being moved rapidly in the air by the flexible rod member.

9. A cat exercise toy as recited in claim 8, wherein the target member is a brightly colored rubber mouse or bird.

10. A cat exercise toy as recited in claim 8, wherein the target member is a bunching of brightly colored rubber strands.

11. A cat exercise toy as recited in claim 8, wherein the target member includes means for producing a sound for attracting the attention of a cat.

12. A cat exercise toy, comprising:

a target member for being batted about and chased by a cat;

sensing means for detecting the presence and the movement of the cat;

means for moving the target member responsive to the sensing means; and means for automatically disconnecting the target member from the means for moving while the target member is subdued by the cat.

13. A cat exercise toy as recited in claim 12, wherein the sensing means includes a motion detector from the group consisting of infrared pyrometers, photodiodes, phototransistors, silicon pn-junction detectors, silicon PIN diodes, GaA diffusion detectors, GaA Schottky type detectors, GaP photodiodes, and CCD detector arrays.

14. A cat exercise toy as recited in claim 13, wherein the means for moving includes an electric motor electrically connected to the motion detector via an electronic circuit including a variable comparator for adjusting the sensitivity of the motion detector, a variable timer for selecting a suitable time period for the target member to remain in motion after the means for moving has been actuated, and a power amplifier for actuating the electric motor.

15. A cat exercise toy as recited in claim 14, wherein the means for moving further comprises a drive shaft connected at a lower end to the electric motor and further connected at an upper end to a driving gear, the driving gear being further connected to a cam via a driving link, the cam being further connected to a flexible rod member via a cam link, the flexible rod member being further connected to the target member for moving the target member responsive to the electric motor.

16. A cat exercise toy as recited in claim 15, wherein the means for disconnecting the target member from the means for moving disconnects the cam link from the cam.

17. A cat exercise toy as recited in claim 16, wherein the sensing means further comprises a remote motion detector for sensing the presence and the motion of a cat in a designated response area remote from the target member.

18. A cat exercise toy as recited in claim 12, wherein the means for moving includes an electric motor, and wherein the sensing means is connected to the electric motor via an electronic circuit including an amplifier circuit for amplifying an electric signal generated by the sensing means, and a switching circuit operative in response to the amplifier circuit for actuating the electric motor.

19. A cat exercise toy as recited in claim 18, wherein the means for moving further comprises a drive shaft connected at a lower end to the electric motor and further connected at an upper end to a driving gear, the driving gear being further connected to a cam via a driving link, the cam being further connected to a flexible rod member via a cam link, the flexible rod member being further connected to the target member for moving the target member responsive to the electric motor.

20. A cat exercise toy as recited in claim 19, further comprising means for disconnecting the cam link from the cam when the target member is subdued by the cat.

* * * * *